United States Patent Office 3,654,227
Patented Apr. 4, 1972

3,654,227
MANUFACTURE OF AROMATIC POLYIMIDES AND PROCESS FOR PREPARATION OF REINFORCED POLYMER ARTICLE FROM SAID POLYIMIDES
Raymond Anthony Dine-Hart, Farnborough, England, assignor to National Research Development Corporation, London, England
No Drawing. Filed Apr. 12, 1968, Ser. No. 721,093
Claims priority, application Great Britain, Apr. 13, 1967, 17,116/67; Dec. 1, 1967, 54,823/67
Int. Cl. C08g 20/32
U.S. Cl. 260—37 N
17 Claims

ABSTRACT OF THE DISCLOSURE

A process for the manufacture of aromatic polyimides is provided and comprises fusing an aromatic tetracarboxylic acid dianhydride, or derivative thereof, with a diorganocarbonyl derivative of an aromatic diamine whereby carboxylic acids or related simple organic compounds are eliminated and aromatic polyimides are obtained without the necessity of passing through the polyamic acid stage.

Preferably the dianhydride is fused with the diacetyl derivative of the relevant diamine and by control of the reaction conditions and product of the process may be either a generally insoluble and infusible polyimide or a soluble, fusible polymer which may be molded to produce an insoluble and infusible polyimide by further heat or may be used in the manufacture of composite by conventional methods; for example by impregnation in a fiber reinforcing material in solution, removal of the solvent followed by molding under heat and pressure and post cure.

DISCLOSURE

This invention relates to improvements in the manufacture of aromatic polyimides.

Aromatic polyimides are normally prepared from an intermediate polyamic acid, which is an aromatic polyamide having pendant carboxylic acid groups. Polyimide formation is achieved by cyclising the polyamic acid by dehydration with heat or by chemical means. Polyamic acids are usually obtained by condensation of an aromatic tetracarboxylic dianhydride represented by Formula I and an aromatic diamine represented by Formula II is a highly polar solvent such as N,N-dimethylformamide.

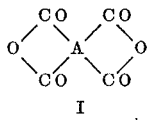   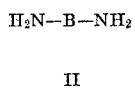

I       II

In these formulae A is a quadrivalent aromatic radical, the valencies being arranged in pairs so that the anhydride rings are five-membered or six-membered, B is a bivalent aromatic radical. Anhydride rings attached to the peri-positions of a naphthalene nucleus are six-membered.

Suitable dianhydrides are pyromellitic dianhydride,
naphthalene-2,3,6,7-tetracarboxylic acid dianhydride,
3,3',4,4'-diphenyl-tetracarboxylic acid dianhydride,
naphthalene-1,2,5,6-tetracarboxylic acid dianhydride,
diphenyl-2,2',3,3'-tetracarboxylic acid dianhydride,
2,2-bis-(3,4-dicarboxyphenyl)-propane dianhydride,
bis-(3,4-dicarboxyphenyl) sulphone dianhydride,
bis-(3,4-dicarboxyphenyl) ether dianhydride,
2,2-bis-(2,3-dicarboxyphenyl) propane dianhydride,
1,1-bis-(2,3-dicarboxyphenyl) ethane dianhydride,
1,2-bis-(3,4-dicarboxyphenyl) ethane dianhydride,
bis-(2,3-dicarboxyphenyl) methane dianhydride,
bis-(3,4-dicarboxyphenyl) methane dianhydride,
bis-(3,4-dicarboxyphenyl) sulphone dianhydride,
benzophenone-2,2',3,3'-tetracarboxylic acid dianhydride, and mixtures thereof. The usually preferred dianhydrides are pyromellitic dianhydride and benzophenone-3,3',4,4'-tetracarboxylic acid dianhydride.

Examples of the diamines are m- and p-phenylenediamines,
4,4'-diaminodiphenyl propane,
4,4'-diaminodiphenyl methane,
4,4'-diaminodiphenylamine,
benzidine,
4,4'-diaminodiphenyl sulphide,
4,4'-diaminodiphenyl sulphone,
3,3'-diamino diphenyl sulphone,
4,4'-diaminodiphenyl ether,
bis-(4-aminophenyl)-N-methylamine,
1,5-diaminonaphthalene,
3,3'-dimethyl-4,4'-diaminodiphenyl,
3,3'-dimethoxybenzidine,
1,4-bis-(p-aminophenoxy)benzene,
1,3-bis-(p-aminophenoxy)benzene and mixtures thereof. The usually preferred iamines are m-phenylene diamine, 4,4'-diaminodiphenylmethane, benzidine, 4,4'-diaminodiphenyl sulphide and 4,4'-diaminodiphenyl ether.

The dianhydrides and diamines condense to yield initially polyamic acids of the general Formula III;

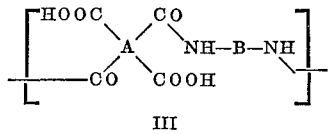

III and elimination of water leads to ring closure along the polymer chain producing polyimides of the Formula IV;

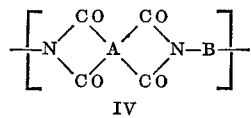

IV

It is normally necessary to cyclise the polyamic acid fairly quickly after its formation as both the solution of the polyamic acid and the isolated polyamic acid are inconvenient to handle. Consequently it is difficult to sell, store or transport polyamic acids intended for later ring closure to polyimides. This is particularly disadvantageous to producers of reinforced polymer materials who would ideally wish to receive stable solutions of polymer or polymer precursor for impregnation into reinforcing materials.

An important object of the present invention is to provide a process for preparing aromatic polyimides without the production of intermediate polyamic acids. A further aim is to provide polymer solutions which may be quite stable and which may be used, with fillers if desired, in the preparation of thermosetting mouldings and with reinforcements in the production of laminates and composites.

In accordance with the present invention a process for the production of an aromatic polyimide comprises reacting an acidic reactant which is an aromatic tetracarboxylic acid, or derivative thereof, wherein the carboxylic acid groups are arranged in pairs and each pair is directly attached to adjacent nuclear carbon atoms, with a diorganocarbonyl derivative of an aromatic diamine. Whereby simple organic compounds such as carboxylic acids, alcohols, esters or amines, are eliminated and an aromatic polyimide is formed.

Suitable aromatic tetracarboxylic acid derivatives include the dianhydride, tetra-ester, diacid/diester, di-ester/anhydride, diacid/anhydride. Preferably the acidic reactant is the dianhydride of the tetracarboxylic acid and is represented by the Formula I above wherein A is a tetravalent aromatic group represented by the formula:

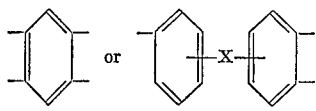

wherein X represents a direct link or a divalent linking atom or group and is advantageously —O—, —S—, —CO—, —SO$_2$—, —CONH—, —CR'R"— where R' and R" are each hydrogen atoms or hydrocarbon groups or together form a divalent hydrocarbon group; and the amine reactant is a diacyl derivative of an aromatic amine and is represented by the Formula II above wherein one of the hydrogen atoms has been replaced by an acyl group and B is a divalent aromatic group which may be phenylene or which is represented by the formula

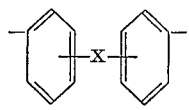

wherein X is as defined above.

It will be readily seen that a stoichiometric reaction will involve equimolar proportions of these reactants.

The proportions of the reactants may be varied within quite wide limits from substantially equimolar proportions to a ratio of 2:1 of acidic reactant to amine reactant, and generally there will be between about 1.2 and 2.0 molar proportions of acidic reactant to diamine derivative. The preferred range is between about 1.4 to 1.8 molar proportions of acidic reactant to one of diamine derivatives. However, it should be noted that in one of the modifications hereinafter described it is proposed that the acidic reactant be a mixture and furthermore that initially the individual acidic reactants be reacted separately with the diamine derivative. In one or other of these preliminary reactions the reactants may be present in substantially equimolar proportions but it is the overall proportion of acidic reactant to diamine derivative in the finally produced polyimide that is referred to in the statement above regarding preferred proportions.

Preferred classes of compounds for use in this process of the present invention are those in which A is a quadrivalent benzenoid group, B is a phenylene group or in which the linking group X above is a direct link or an —O—, —CO—, —SO$_2$—, or —CH$_2$— group and the preferred dianhydrides for the processes disclosed herein are pyromellitic dianhydride (hereinafter designated PMDA) and benzophenone-3,3',4,4'-tetracarboxylic acid dianhydride (BTDA), and the preferred diamines are diamino diphenyl methane (DDM), diaminodiphenyl ether (DAPE), 4,4'-diaminobenzophenone (DBP), 4,4'-diaminodiphenylsulphone and m - phenylene diamine (MPD). The first two of these have the systematic names 4,4'-diaminodiphenyl methane, 4,4'-diaminodiphenyl ether respectively.

Suitable n-acyl derivatives of the diamines include the N-formyl, N-acetyl, N-butyryl, and N-benzoyl derivatives. It has been found that the volatility of the eliminated reaction product determines the rate of polymerization. Thus when, for instance, an aromatic dianhydride is reacted with a diacyl derivative of an aromatic diamine the reaction proceeds very rapidly in the case of di- formyl and diacetyldiamines but quite slowly in the case of, for example, dibutyryldiamines and dibenzoyldiamines because of the higher volatility of formic acid compared with higher molecular weight acids. The use of benzoyl derivatives of aromatic amines however may be useful for the formation of aromatic terminal groups to polymers principally prepared from other acyl derivatives of aromatic amines since the benzoyl derivatives are known to react only very slowly.

In a preferred process an aromatic tetracarboxylic dianhydride is fused with N-N'-diformyl or N-N'-diacetyl derivative of an aromatic diamine.

Where the elimination of a carboxylic acid is undesirable the reaction between a diester/diacid or tetra ester derivative of an aromatic tetracarboxylic acid and the N-acyl derivative of an aromatic diamine in accordance with the invention results in the elimination of esters, which may be volatile.

The process for the production of aromatic polyimides proceeds smoothly in the melt above about 200° C. with the elimination of a carboxylic ester and formation of polyimide without the necessity of preparing and isolating a polyamic acid intermediate and when the reactants are heated together for only a few minutes at 200°–240° C. and allowed to cool, a crystalline mass is obtained. When the heating is continued a progressive colour change from colourless to amber may be observed and either a carboxylic acid or carboxylic ester is evolved and the viscosity of the solution increases. Prolonged heating, for example for several hours, results in the formation of an insoluble high polymer, but if the period of heating at temperature is between about ten minutes and about an hour then, on cooling, a brittle glass-like soluble low polymer is obtained. The course of the reaction may be followed, for example, by comparison of the weight loss due to the evolution of carboxylic acid or ester with the theoretical weight loss. The period of heating required to form a low polymer is critically dependent on the nature of the reactants.

In accordance with an important feature of the invention, soluble, partially condensed polymers are obtained by fusion of an aromatic tetracarboxylic anhydride or a derivative thereof with a diacyl derivative of an aromatic diamine below about 240° C. whereupon the amber liquid cools to a brittle glass-like polymer without crystallisation. This low polymer is soluble in polar solvents, for example, tetrahydrofuran (T.H.F.), acetic acid, acetic anhydride, chloroform, acetone and ethyl acetate sometimes leaving a small amount of insoluble residue which it is not necessary to remove when using a solution of the polymer for impregnating purposes.

The reaction between an aromatic dianhydride represented by Formula I or a derivative thereof and an N,N'-diacyl derivative of an aromatic diamine which may have the general formula R·CO—NH—B—NH—CO·R (where B is as defined above and R is a lower alkyl or a simple aryl group) yields an imide polymer, cross-linked or straight-chain having repeating units represented by the Formula IV. The reaction results in the elimination of a carboxylic acid RCOOH and is believed to take place via an intermediate structure represented by Formula V:

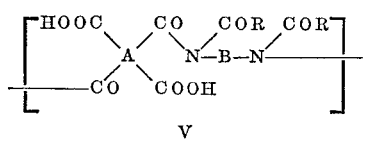

V

Polyimides containing variable amounts of this intermediate have been isolated by heating a tetraacid or its derivative with a diacyl diamine for about 5–10 hours in high boiling solvents such as nitrobenzene, o-dichlorobenzene, quinoline, pyridine and N-methyl pyrrolidone. The accuracy or otherwise of the above postulated mechanism is not to be construed as a limitation on the scope of this invention.

Although the process may be carried out in the melt without solvents or diluents it may advantageously be carried out by heating a slurry of the reactants in a suitable medium, for example a carboxylic acid, or anhydride, or a mixture of these, to a temperature above about 200° C. when the reaction proceeds as before and a polyimide is formed. In general also the carboxylic acid, and/or anhydride will be substantially driven off during the reaction leaving only the polyimide product. The advantage of this mode of operation is realised when the process is scaled up, the carboxylic acid and/or anhydride acting as a heat transfer medium. This modification has the further advantage that by suitable choice of reactants the complete process may be carried out in one reaction vessel starting from the diamine itself, which is normally the starting point of the process. For example, if the diamine derivative chosen is the diacetyl derivative this may be prepared by treating the diamine with a mixture of acetic acid and acetic anhydride to yield a solution or slurry of the diacetyl derivative of the diamine in acetic acid/acetic anhydride to which may be added a tetracarboxylic acid dianhydride for reaction as disclosed herein to produce an aromatic polyimide.

In accordance with a further feature of the invention, strong, thermosetting polyimides may be prepared by melt polymerising an aromatic tetracarboxylic acid, or derivative thereof, and a di-(organocarbonyl derivative) of an aromatic diamine around suitable filler. Suitable fillers, which should be thermally stable and chemically inert, include cured polyimide powder. For example, a preferred filler is a polyimide powder prepared from an aromatic diamine and PMDA and this filler is advantageously used in combination with a melt polymer of an aromatic diamine diacetate and BTDA prepared as disclosed herein. With polyimide powders as a filler a resin content of between about 30 and 60% by weight is used. The reactants are melt polymerized at between about 200 and 240° C., substantially as hereinbefore described, around the cured powder. The resultant mass is granulated and heated at between about 260°–300° C. Post cure at between about 400 and 450° C. gives rise to thermoset opaque black apparently homogeneous material which may have a flexural strength as high as 10,000 to 11,000 p.s.i. at room temperature. In general the mechanical properties of thermoset materials prepared in this way are dependant more upon the characteristics of the filler than upon the melt polymer formed around the filler.

The process for the production of aromatic polyimides hereinbefore described may be readily adapted to produce reinforced aromatic polyimides containing fibres such as glass fibre, asbestos and carbon fibre.

A preferred method of producing reinforced aromatic polyimides consists in impregnating a matrix of fibres with a solution of a soluble polyimide prepared as hereinbefore described and heating the impregnated matrix to remove the solvent. The polyimide may also be applied to the matrix of fibres as a melt. Layers of impregnated fibre matrix may be compressed under pressure and heat to form strengthened laminates. Typically, laminates are prepared by heating in the press at temperatures up to 300° C. and pressures up to about 1,000 p.s.i. and finally post curing in stages at temperatures up to about 450° C. preferably with some hours at 350–400° C. An alternative method of production is to cover the fibres with intimately mixed reactants as hereinbefore described which are then melt polymerised in situ.

A further method of producing reinforced aromatic polyimide matrices comprises impregnating suitable fibres with a solution of the reactants as hereinbefore described and heating the impregnated fibre matrix to achieve both polymerisation of the reactants and removal of the solvent. A useful solvent for this purpose is a mixture of acetone and tetrahydrofuran. Disadvantages of this method are the poor solubility of the reactants and the insufficiency of mixing of the reactants as they crystallise out of solution during the initial heating.

It is found that, generally, polyimide resins derived from a mixture of dianhydrides have better thermal and mechanical properties than resins prepared from a single dianhydride.

When a mixture, generally of two, of dianhydrides is used, all the reactants may be placed together in the reaction vessel from the start or alternatively the aromatic carboxylic dianhydrides may be taken individually to the soluble fusible intermediate stage and mixed prior to impregnation and curing to produce a composite.

Advantages to be gained from this are that each of the anhydrides may be taken to the intermediate stage under optimum conditions also the intermediates so obtained usually go completely into solution in the solvent used for impregnation, and the composites produced generally have greater strength and thermal stability. It will be understood that when a dianhydride is reacted with a diamine derivative to produce an intermediate for mixing with the product of another reaction the dianhydride and the diamine may be present in proportions other than the above mentioned proportion. It is the total molar proportion of dianhydride and diamine that goes into the final aromatic polyimide that determines whether a process is included within the scope of the present invention.

Typical processes for the production of aromatic polyimides in accordance with the present invention will now be described by way of example only:

Example 1

PMDA (40.0 g.: 2 molar parts) and diacetyl DDM (26.0 g.: 1 molar part) were blended to a stiff slurry in a mixture of acetic acid (60.0 g.) and acetic anhydride (40.0 g.). This mixture was heated to 250° C. over a period of 1½ hours during which time the acetic acid and acetic anhydride distilled off and a uniform dark red melt was obtained. The temperature was held at 250° C. for 15 minutes and the resin then cooled to a dark brown brittle mass which was completely soluble in acetone (260 g.). Carbon fibre (10 g.) was impregnated with resin solution (60 g.), and dried at 80° C. to give a smooth homogeneous mass which was pre-cured at 250° for 2 hours. 4–5 g. samples were then moulded at initial temperature of 250° C. and held for ½ hour at 500 p.s.i. and then taken up to 350° C. over a period of ½ hour at the same pressure. Considerable flow was observed at about 300° C. with rapid hardening occurring above this temperature. Samples were postcured at 400° C. for 1 hour. Fexural strengths were in the range 78,000 to 80,000 p.s.i. Thermal analysis showed an initially large weight loss of 32% below 400° C. but a steady isothermal weight loss of 3% hr.$^{-1}$ at 400° C.

Example 2

PMDA (20.0 g.:9 molar parts), BTDA (10.0 g.:3 molar parts) and diacetyl DDM (22.0 g.:8 molar parts) were made into a thick slurry with acetic anhydride (10.0 g.) and acetic acid (40.0 g.). The slurry was heated to 220° C. with stirring over a period of 1½ hours to give the resin intermediate, which was soluble in acetone but precipitated above 20% w./w. The acetic acid and acetic anhydride was distilled off during the heating. A 10% w./w. solution was prepared in acetone and 500 g. of solution was poured over aligned carbon fibre (50 g.), gradually dried at 80° C. to give a smooth pre-preg. This was pre-cured at 190° C. for 1 hour and 210° C. for 8 hours prior to laminating. The material was then cut into strips to fit a panel mould, and pressed 260°–300° C. over 1 hour at 500 to 800 p.s.i. After removing from the mould the panel was post-cured at 300° C. to 400° C. over a period of 1 hour. The average flexural strength was 82,000 p.s.i. The final resin content was approximately 40% and the thermal stability of the resin in the composites was 1.0–1.5% hr.$^{-1}$ at 400° C.

Example 3

PMDA (89.0 g.:4 molar parts), BTDA (89.0 g.:3 molar parts) and diacetyl DDM (135.0 g.: 5 molar parts) were made into a slurry with acetic anhydride (100 g.) and acetic acid (100 g.). This was heated with stirring up to 240° C. over a period of 1½ hours during which time the acetic acid and acetic anhydride distilled off and a dark fluid resin was formed and poured into a tray to harden. 20% and 30% solutions of 50 g. resin in acetone were prepared and applied to two aligned samples of carbon fibre (50.0 g.). The 30% sample airdried to a less homogeneous pre-preg than the 20% sample as a result of partial precipitation during evaporation. They were both dried at 40° C. for 1 hour and stored at R.T. for several days. They were then pre-cured at 210° C. for 5 hours with initial softening and loss of PMDA (0.1–0.2 g.). Laminated panels were then prepared as described in Example 2, post-cured for 1 hour at 300°–400° C. and an additional ½ hour at 400° C. The flexural strength was 86,000 p.s.i.

By way of comparison with Examples 2 and 3 a carbon fibre composite prepared from PMDA, BTDA and diacetyl DDM having equimolar proportions of diahydride and diamine had a flexural strength of 75,000 p.s.i. (see Example 3 in application No. 17,116/67).

Example 4

Resin intermediates were prepared broadly as described in Example 1 with the modification that the diamine was acetylated in situ immediately proior to addition of, and reaction with, the dianhydride.

(a) DDM (142 g.:1 molar part) was mixed to a stiff slurry with acetic acid (150 ml.) and acetic anhydride (300 ml.). On gentle heating a strongly exothermic reaction took place and the reaction mixture was cooled so that the temperature did not rise above 90° C. When the acetylation reaction was complete the slurry of diacetyl DDM in acetic acid/acetic anhydride was cooled and PDMA (218 g.:2 molar) bracket parts was added. The reaction was then carried out in accordance with Example 1 to yield 330 g. of resin intermediate.

(b) Similarly DDM (142 g.:1 molar part) was acetylated with a mixture of acetic acid (170 ml.) and acetic anhydride (350 ml.) and after cooling immediately reacted with BTDA (163 g.:1 molar part) by heating to 240° C. over 1½ hours to yield 310 g. of resin intermediate.

These resin intermediates were then mixed in acetone solution to yield solutions for the impregnation of carbon fibres. By taking one part by weight of each of the intermediates prepared in accordance with (a) and (b) above, a resin having the approximate composition of 2 molar parts PMDA, 1 molar part BTDA and 2 molar parts diacetyl DDM was produced and by taking one part by weight of the intermediate prepared in accordance with (a) above and two parts by weight of the intermediate prepared in accordance with (b) above a resin having the approximate composition 2 molar parts PMDA, 2 molar parts BTDA and 3 molar parts diacetyl DDM was produced. Mixing was carried out in 20% w./w. solution in acetone and aligned carbon fibres were impregnated with the resulting solution to give initially a tacky pre-preg having a composition og 50/50 resin/fibre after air-drying.

The pre-pregs were pre-cured at 210° C., 2 hours for the first mentioned composition and 6 hours for the second mentioned. Samples were moulded at temperatures between 240 and 300° C. at pressures between 800 and 1000 p.s.i. and finally post-cured at 400° C. for ½ hour. The physical properties of the final products do not seem to be critically dependent upon the composition of the impregnating resin. For example, the flexural strengths vary within the range 85,000 to 99,000 p.s.i. and are mostly in the range 90,000 to 95,000 p.s.i.

The final resin content is in the range 35–40% by weight and the weight loss in the range 0.5 to 1.0% hr.$^{-1}$ at 400° C. in air.

Example 5

PMDA (2.18 g.:2 molar parts), BTDA (1.61 g.:1 molar part) and diacetyl MPD (2.80 g.:3 molar parts) were mixed to a stiff slurry in acetic acid/acetic anhydride mixture (5 ml. of a 50/50 mixture) and heated up to 240° C. to yield a fused dark amber resin. On cooling this became a brittle glass-like material that was completely soluble at 20–30% by weight in acetone. A 20% by weight solution in acetone was applied to carbon fibres (6.0 g.). The crude composite was air-dried at 40° C., pre-cured for 3 hours at 230° C. and moulded at 260–300° C. under 500 p.s.i. for 1 hour, with a final post-curing at 400° C. for ½ hour.

The flexural strength was in the range 80,000 to 85,000 p.s.i. with a resin content of 40% by weight. Thermal analysis showed that the rate of weight loss was 0.5% hr.$^{-1}$ at 400° C. to air.

Example 6

Resins containing respectively two molar prooprtions of PMDA and one molar proportion of BDTA to one molar proportion of diacetyl-4, 4-diamino-diphenylsulphone by acetic acid/acetic anhydride slurry method described above with the modification that the reaction mixture was carefully heated to above 200° C. with vigorous stirring. This was caused by the relatively high melting point of the diacetylsulphone, which meant that little reaction had occurred before all the mixed solvent had boiled off at about 150° C. After heating at a temperature of 220° C. for between 20 and 30 minutes resins with suitable solubility properties were obtained.

For the preparation of carbon fibre composites 10 g. each of the two resinn were dissolved in 80 g. acetone to give a homogeneous dark amber solution. This was then used to impregnate 20 g. of aligned fibre dried at room temperature 2 hours, 40° 2 hours and heated at 90° C. 1 hour to give a uniform pre-preg. After pre-curing 3½ hours at 220° C. the pre-preg was cut into 2½" strips and used for moulding bars of composite.

This resin was found to have slower curing characteristics than the D.A.D.D.M. and D.A.M.P.D. resins, consequently the same rising temperature moulding cycle was used, but pressure was not applied till the temperature was 280–290° C. The cure was completed at 300° C. under 800 p.s.i for ½ hour, then removed from the mould and post-cured at 400° C. ½ hour to give composites with approixmately 35% resin content.

Flexural strengths were in the range 80 to 90×10$^3$ p.s.i.

Example 7

DAPE (745 g. 1 molar proportion) was added to a mixture of acetic anhydride (1500 ml.) and acetic acid (1350 ml.) with a maximum temperature of 60° C. After stirring for 2 hours BTDA (1200 g. 1 molar proportion was added). The acetic acid anhydride mixture was removed by distillation during 157 minutes. The residue was finally heated at 222±2° C. for 1 hour. The resulting resin was soluble at 40% in acetone.

In the description of the present invention the term aromatic polyimide means an aromatic polymer containing imide groups and prepared by the processes of the present invention.

What we claim is:

1. A process for the production of a reinforced polymer article which comprises reacting at least one tetracarboxylic acid dianhydride selected from the group consisting of pyromellitic dianhydride and benzophenone-3,3':4,4'-tetracarboxylic acid dianhydride with an N,N'-diacyl derivative of one or more aromatic diamines selected from the group consisting of m-phenylene diamine, 4,4' - diaminodiphenyl methane, 4,4' - diaminobenzophenone, and 4,4' - diaminophenyl sulphone, wherein the molar ratio of tetracarboxylic acid dianhydride to N,N'-diacyl derivative of aromatic diamine is between about 1:1 and 2:1, the said reaction being carried out in bulk or in a medium selected from the group consisting of carboxylic acids, carboxylic acid anhydrides, and mixtures thereof, at a temperature between about 200° C. and 240° C. whereby carboxylic acids or esters or both are eliminated and soluble fusible material is produced, impregnating said soluble, fusible material or a solution thereof, in a matrix of filler or fiber reinforcing materials, removing the solvent, if present and subjecting the composite material to heat and pressure whereby a reinforced aromatic polyimide is produced.

2. A process for the production of a soluble fusible pre-polymer which comprises reacting an acidic reactant, which is at least one member of the group consisting of aromatic tetracarboxylic acid, dianhydride of aromatic tetracarboxylic acid, tetraester of aromatic tetracarboxylic acid, diester of aromatic tetracarboxylic acid, anhydride/diester of aromatic tetracarboxylic acid and monoanhydride of aromatic tetracarboxylic acid, wherein the carboxyl groups are arranged in pairs the members of each pair being attached directly to adjacent nuclear carbon atoms, with an amine reactant which is at least one N,N'-diacyl derivative of at least one aromatic diprimary diamine in which the primary amino groups are attached directly to nuclear carbon atoms, wherein the molar ratio of acidic reactant to amine reactant is between about 1:1 to 2:1, the said reaction being carried out in bulk or in a diluent which is a monocarboxylic acid, a monocarboxylic acid anhydride, or a mixture thereof, whereby carboxylic acids or esters are eliminated and a soluble fusible pre-polymer is produced.

3. A process for the production of a soluble fusible pre-polymer which comprises reacting together (1) a dianhydride of a tetracarboxylic acid represented by the formula

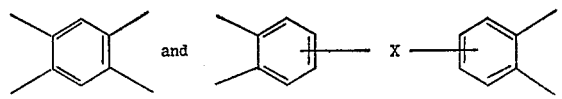

wherein A is represented by one of the formulae:

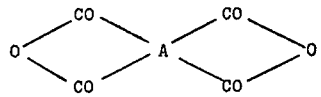

wherein X is selected from the group of direct link, —O—, —S—, —CO—, —CO.NH—, and —CR'R''— where R' and R'' are each hydrogen atoms or hydrocarbon groups or together form a divalent hydrocarbon group, and (2) an N,N'-diacyl derivative of an aromatic diamine represented by the formula H₂N—B—NH₂ wherein B is a divalent aromatic group which is a phenylene group or which is represented by formula:

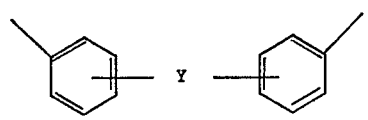

wherein Y is selected from the group consisting of direct link, —O—, —S—, —CO—, —CO.NH—, and

—CR'R''— where R' and R'' are hydrogen atoms or hydrocarbon groups or together form a divalent hydrocarbon group, wherein the molar ratio of tetracarboxylic acid dianhydride N,N'-diacyl derivative of aromatic diamine is between about 1:1 and 2:1, the said reaction being carried out in bulk or in a medium selected from the group consisting of carboxylic acids, carboxylic acid anhydrides and mixtures thereof, at a temperature between about 200 and 240° C. whereby carboxylic acids or esters or both are eliminated and a soluble fusible prepolymer is produced.

4. A process as claimed in claim 3 wherein the aromatic diamine derivative is the diacetyl derivative and is prepared in an initial step which comprises treating the appropriate diamine with a mixture of acetic acid and acetic anhydride.

5. A process as claimed in claim 3, and in which the tetracarboxylic acid dianhydride is selected from the group consisting of pyromellitic dianhydride and benzophenone-3,3':4,4'-tetracarboxylic acid dianhydride.

6. A process as claimed in claim 3, and in which the aromatic diamine is selected from the group consisting of m-phenylene diamine, 4,4'-diaminodiphenyl methane, 4,4' - diaminobenzophenone, and 4,4'-diaminodiphenyl sulphone.

7. A process as claimed in claim 3, and in which the aromatic diamine derivative is selected from the group consisting of the formyl and acetyl derivatives.

8. A process as claimed in claim 3 and having a further step of continuing the reaction by subjecting the pre-polymer to heat until a substantially insoluble infusible aromatic polyimide is produced.

9. A process as claimed in claim 3 and having the further step of impregnating said soluble fusible material, or a solution thereof, in a matrix of filler or fiber reinforcing materials, removing any solvent, and subjecting the composite material to heat and pressure whereby a reinforced aromatic polyimide is produced.

10. A process as claimed in claim 9 wherein said process is carried out twice to provide two of said soluble and fusible products, and said products are combined and heat applied so that the reaction continues and reinforced aromatic polyimide is produced.

11. A process as claimed in claim 9, and in which the further heating is carried out at temperatures between about 200° C. and 300° C. and at pressures between about 200 and 1000 p.s.i.

12. A process as claimed in claim 9, and in which the solvent is selected from the group consisting of tetrahydrofuran, acetic acid, acetic anhydride, chloroform, acetone and ethyl acetate.

13. A process as claimed in claim 9, and in which the fiber reinforcing material is selected from the group consisting of glass fiber, asbestos, and carbon fiber.

14. A process for the production of a soluble fusible material which comprises reacting at least one tetracarboxylic acid dianhydride selected from the group consisting of pyromellitic dianhydride and benzophenone-3,3':4,4' - tetracarboxylic acid dianhydride with an N,N'-diacyl derivative of one or more aromatic diamines selected from the group consisting of m-phenylene diamine, 4,4'- diaminodiphenyl methane, 4,4' - diaminobenzophenone, and 4,4'-diaminophenyl sulphone, wherein the molar ratio of tetracarboxylic acid dianhydride to N,N'-diacyl derivative of aromatic diamine is between about 1:1 and 2:1, the said reaction being carried out in bulk or in a medium selected from the group consisting of carboxylic acids, carboxylic acid anhydrides, and mixtures thereof, at a temperature between about 200° C. and 240° C. whereby carboxylic acids or esters or both are eliminated and soluble fusible material is produced.

15. A process as claimed in claim 14, and in which the diamine derivative is the diacetyl derivative and is prepared in an initial step which comprises treating the appropriate diamine with a mixture of acetic acid and acetic anhydride.

16. A process as claimed in cliam 14, and in which the tetracarboxylic acid dianhydride is present in a stoichiometric excess over the derivative of the aromatic diamine.

17. A process as claimed in claim 10 wherein said process is carried out once with pyromellitic dianhydride and once with benzophenone - 3,3',4,4' - tetracarboxylic acid dianhydride.

(References on following page)

FOREIGN PATENTS 26,011  11/1964  Japan ............... 260—78

WILLIAM H. SHORT, Primary Examiner

L. L. LEE, Assistant Examiner

U.S. Cl. X.R.

117—126 GR, 161 UN, 228; 161—197, 205, 227; 260—30.4 N, 31.2 N, 32.8 N, 33.8 R, 47 CP, 65, 78 TF, 78.4 R; 264—137